M. KALLMANN.
ELECTRIC BRAKE FOR ELECTRIC MOTORS.
APPLICATION FILED APR. 23, 1907.
1,007,705.
Patented Nov. 7, 1911.
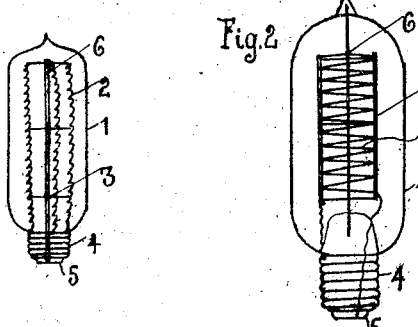
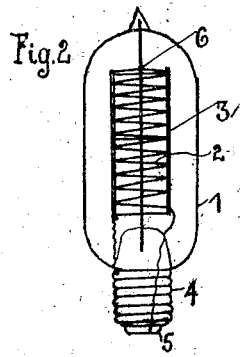
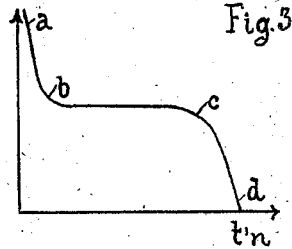
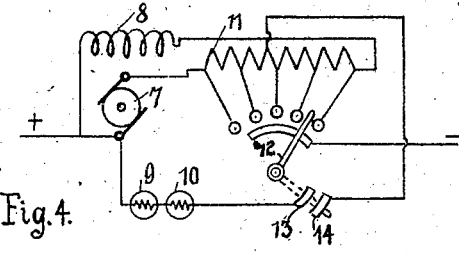
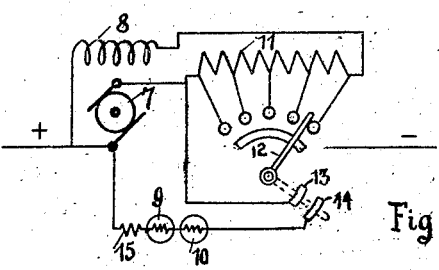
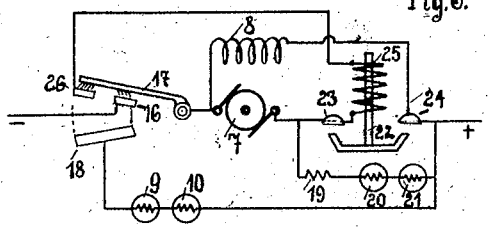
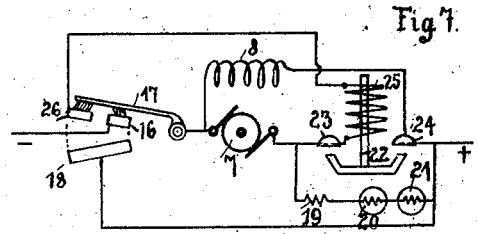
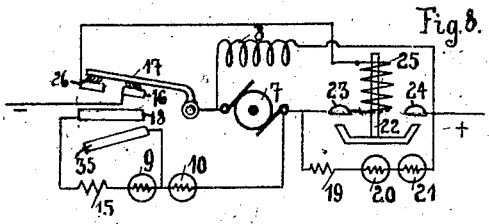
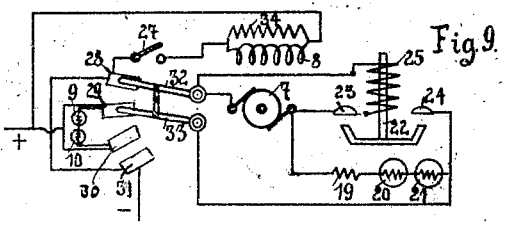
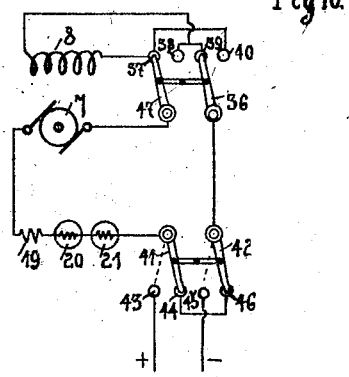
Witnesses:
J. M. Fowler Jr.
A. J. Kitchin
Inventor
Martin Kallmann
By Mason, Fenwick & Lawrence Attys.

UNITED STATES PATENT OFFICE.

MARTIN KALLMANN, OF BERLIN, GERMANY.

ELECTRIC BRAKE FOR ELECTRIC MOTORS.

1,007,705. Specification of Letters Patent. Patented Nov. 7, 1911.

Application filed April 23, 1907. Serial No. 369,790.

*To all whom it may concern:*

Be it known that I, MARTIN KALLMANN, engineer, citizen of Germany, residing at Kurfuerstendamm 40/41, Berlin, Germany, have invented certain new and useful Improvements in Electric Brakes for Electric Motors; and I do hereby declare the following to be a full, clear, and exact description of the invention, such as will enable others skilled in the art to which it appertains to make and use the same.

The hereinafter described devices of electric brakes for electromotors by the dynamo-electric effect or the so-called short circuiting is based on the use of resistances with very high positive temperature-coefficients, for instance iron. Resistances of this kind, which have already been described by applicant for testing, measuring and starting purposes, (in application No. 287,373, filed Nov. 14, 1905) are in the following briefly called variation-resistances. The value of these resistances increases about ten fold when raised from a cold state to a temperature represented by a bright cherry red.

Figures 1 and 2 show samples of such variation-resistances; Fig. 3 shows how the current changes if the motor, as dynamo, works on a variation-resistance; Figs. 4 to 10 show different systems of switching on and off such variation short-circuiting brakes.

In Fig. 1, 2 represents iron spirals or other conductors of a very high positive temperature-coefficient, such as for instance tantalum, wolfram, osmium or the like, all of which are however surpassed by iron. This variation-resistance 2 is in the inside of a glass reservoir 1, which is preferably filled with hydrogen for drawing off the heat and for preventing at the same time oxidation. The iron spirals are held by a support 6 and, as a rule, by means of glass-pearls or other insulating medium 3; 4 and 5 show the junction contact, for instance an Edison socket.

Fig. 2 shows a form of construction slightly different from the above, in which the iron or other wire 2 is wound singly or in several layers around columns 3 covered by an insulating material, for instance kaolin. The whole is carried by a support 6 in a hydrogen atmosphere in the glass 1; 4 and 5 show the feed-contacts.

Similar numerals refer to similar parts throughout the several views.

While the variation resistance Fig. 1 is intended for strengths of currents of about 2 amperes, when the wire is heated until it is red hot, the variation-resistances shown in Fig. 2 serve as a rule for stronger currents, as 5 or several amperes are required in order to heat this iron resistance, made of several parallel wires, to the bright cherry-red. The construction may of course be different. According to the height of the tension several cells of such resistances are connected in series, of which each one is sufficient for 50 up to 100 volts. According to the strength of the current required for braking the motor a correspondingly great number of resistances is connected in parallel.

Electromotors were braked electrically hitherto by connecting the motor switched off from the net with a resistance, so that the motor as a dynamo-machine generates current, which current is the stronger the smaller the resistance connected to its terminals is. This braking method, which is generally called short-circuit braking, acts the more intensively the more work is put on the motor. It is therefore for the first moment if an ordinary, for instance nickeline resistance is used, strongest, and as the resistance remains constant it rapidly decreases when the speed of the motor and the strength of the current sinks. The effect of the brake therefore depends in an about quadratic proportion on the speed of the motor to be braked. In order to brake rapidly and reliably it is necessary that such a constant resistance, when the speed of the motor decreases be switched off by means of a controller in several steps, by hand or automatically, in rapid succession, until it is perfectly, short-circuited, and theoretically this switching off of a constant resistance in steps must take place at a pace such that the current is kept during the braking period nearly constant on the highest value admissible for the motor. The more rapidly this can take place the more rapidly the motor will be stopped. But if the strength of current admissible for the motor is exceeded in consequence of a too rapid switching off of resistance the motor is in danger of getting damaged. The diagram for measuring such a brake-resistance to be switched off in steps is the same as that for starters, as also here the brake current must be maintained within narrow limits on the highest admissible current. All these difficulties are avoided if instead of the ordinary resistances the above described variation-resistances are used.

Fig. 3 shows the diagram of the intensity of the current. The variation-resistance which, if necessary, is heated up to incandescence, has at the beginning in the cold state a very small value, so that the motor switched on to it must supply a considerable initial shock of current (point $a$ of the curve) as dynamo. This initial shock of current, which may be made to be different according to the variation-resistances, is further weakened, if it is necessary for the safety of the motor, by switching on a proportionately small ordinary or constant resistance, for instance of nickeline before the iron resistance, in order to keep the initial value of both resistances together at a sufficient height, and limit the current thereby. This precaution is however frequently not necessary, as in consequence of the short duration of the shock of the current, damaging of the armature or the like need not be feared. But this short shock of current $a$ acts in consequence of the sudden and pronounced heating effect very advantageously on the shortening of the time necessary for braking. A condition is however that the variators are made of very thin conductors which are easily heated and cooled, as a rule, of iron wire of a very small heat-capacity and therefore small inertia. Filling the glass boxes with hydrogen of a sufficient pressure also acts very favorably in this respect on account of the great heat conducting capacity of the hydrogen. The wires must become hot almost instantaneously, and when the current sinks, cool down again at once. This action may be further favored by plunging the glass vessels into a cooling fluid. The specific resistance rises on being heated from the cold up to the red-hot state nearly tenfold. After the first shock of the current $a$ the current sinks to the normal value $b$ on which it is to be kept as constant as possible almost during the whole braking-time (for instance 1 second) about up to point $c$ of the curve. Toward the end of the braking-period the current must finally sink as the speed, and thereby the tension produced, has considerably decreased and the resistance has become cold and cannot be more reduced and reaches at the end at the stopping point at $d$ the zero value. If necessary, for instance, in the case of large motors and considerable accelerating influences of the motor switched off from the net, a division of the variation-resistance into 2 steps, (but rarely more than two,) may be required for shortening the braking-time. In order to accelerate the stopping the complete short-circuiting of the resistance by hand or automatically may take place. For most cases however the self variability of the variation-resistance alone is sufficient without any artificial manipulations, as shown in Fig. 3, where the ordinate represents the current, the abscissa the duration or number of revolutions. The working is therefore such that by the initial shock of current of the motor acting as a dynamo the variation-resistance is quickly heated until it is redhot and then cools down at the rate of the sinking of the tension or of the speed, and its specific resistance is automatically reduced.

The different connections in Figs. 4 to 10 show the use, for some cases, of the working of shunt- and series-direct current-motors. They can also be used for compound and other motors for hoists and lifts, tramways, automobiles and similar vehicles, and in other manner for three-phase motors and the like.

In Fig. 4 the shunt-motor 7, whose magnetic field is represented by 8 is after switching-off the starting-resistance 11 by means of the crank 12, and after the disconnection from the net connected with the series-connected variation-resistances and a part of the starting-resistance 11, by means of the crank and the contacts 13 and 14. Fig. 5 also shows a hand-starter on the motor 7, whose shunt is represented by 8, but the starting-resistance 11 is not used for the braking, but the crank 12, after switching off the resistance and the net, switches the armature by means of the contacts 13 and 14 on the brake-resistance 9, 10 and 15, of which 9 and 10 are variation-resistances and 15 an ordinary resistance for weakening the initial current.

Fig. 6 shows an automatic starter in connection with variation resistances. The motor 7, whose magnetic field is represented by 8, is in the position of the crank 17 on contact 26 and 16 connected to the net with the intercalation of the variation-resistances 20 and 21, and the constant supplementary resistance 19. The winding of the starting-relay 25 is in this position, as will be seen, connected through 23 and 26 to the armature 7 of the motor. After the motor has been started, the armature 22 of the relay is drawn up as the tension of the armature increases, and makes contact at 23 and 24, whereby the starting-resistance is short circuited. On the switching off crank 17 breaks the net and the winding of the relay at 16 and 26 and the loose-running motor 7 is connected over contact 18 with the brake-resistance 9 and 10, which is formed by variation-resistance, while at the same time, in consequence of the interruption which automatically takes place at 23 and 24, the starting resistance 19, 20, 21 is during the braking likewise in circuit. This may as a rule be done without reducing the braking-current too much, as the cold starting variation-resistance possesses only a small value.

In Fig. 7 the starting resistance is again represented by 19, 20, 21 and also the other marks are the same as in Fig. 6. By moving the switch 17 from 16 to 18 the starting-resistance 20, 21 together with supplementary weakening resistance, is connected to the armature 7, and is thus used for starting and braking purposes. Fig. 8 shows again this arrangement of automatic starters with the same marks, but the switching off of a special brake-resistance 9, 10 and 15 takes place here in two steps, as in the position of the crank 17 on contact 18 the whole braking-resistance 9, 10, 15 is connected to the armature 7 of the motor and if moved farther on to contact 35 only the variation-resistance 10 serves for the braking, in order to increase the effect.

Fig. 9 shows a reversing automatic starter. The armature 7 of the shunt motor selected as a sample here is in the position of the bipolar switch 32, 33 on the contact 28 and 29, connected to the net, with the starting resistance 19, 20, 21 intercalated. With the increased tension the relay 25 is more strongly excited and finally short-circuits, by means of the arm 22 of its iron-core at 23, 24 the starting-resistance, whereupon the full speed of the motor is attained. The magnetic field 8 is for instance by closing the cut-out 27 directly connected to the net and possesses a parallel resistance 34 for weakening the extra-current. In order to brake, the switch 32, 33 is more or less rapidly moved upon the contacts 29, 30 in consequence of which the armature 7 is switched off from the net and its starting resistance 19, 20, 21 which has eventually automatically intercalated itself again, is connected on the brake-resistance 9 and 10, made for instance of iron. On the further movement of switch 32, 33 upon the contact pieces 30, 31 the motor will be restarted in the opposite direction, as the armature current is now conducted to it in the reverse direction.

Fig. 10 finally shows the application of the invention to series-motors. The armature 7 is by moving the switch 36, 47 on the contacts 37, 39 connected in series with the magnetic field 8, and by moving the switch 41, 42 on the contact 43, 43 the series-motor is started by the above described hand starter, or an automatic starter, and finally the starting resistance is switched off. By switching 41, 42 on contact 44 and 46 the motor is however switched off from the net and acts, as will be seen, as a dynamo-machine on the variation starting resistance 19, 20 21, which in this case serves as a brake variation-resistance. With series-motors the magnetic field 8 must, as is well known, moreover be reversed on switching the brake on, which is effected by putting the switch 36, 47 on contact 38 and 40. Also with series-motors the systems of switching described in the previous figures can at once be used. There is still to be noted, that the time up to the heating of the variation resistances, if the same are sufficiently sensitive, is only a small fraction of a second, the same as for instance the lighting up of incandescent lamps on being switched on and the extinguishing of the same on being switched off, which can hardly be followed with the eye. The variators perfectly follow the decrease in the speed of the motor from the start to the stop. If necessary, in the case of an excessively great brake-current, the thin wires of the variation-resistance will themselves act as automatic safeties, as by their rapid heating they weaken at once the dangerous current, and in extreme cases melt off like fuse-blocks, only still more rapidly and reliably, and reopen the braking current. Particularly easy is the application of this new braking-system with motors which possess already variation-resistances for the starting, as these can then, at the same time, be fully or partly used for the braking, but also in the case of all ordinary motors the use of the variation-resistance-brake offers no difficulties, for instance on three-phase motors in connection with the reversal of the rotating field by switching over of the field-winding.

I claim—

1. The combination of a motor circuit, a starting resistance therein, a second resistance electrically controlled by the armature current when the motor is acting as a generator, said resistance last mentioned varying continuously with the armature current by reason of the heating effect thereof, independent of other conditons, and controlling indirectly by such heating effect the speed of the armature.

2. The combination of a motor circuit, a resistance therein controlled by the armature current when the motor is acting as a generator, said resistance varying continuously with the armature current by reason of the heating effect thereof, independent of other conditions, and controlling indirectly, by such heating effect, the speed of the armature, and means for automatically throwing the resistance into circuit upon cutting off the current from the motor.

3. The combination of a motor circuit, a resistance therein controlled by the armature current when the motor is acting as a generator, said resistance varying continuously with the armature current by reason of the heating effect thereof, independent of other conditions, and controlling indirectly, by such heating effect, the speed of the armature, means for throwing the resistance into circuit upon cutting off the current from the motor, and a constant resistance in series with the resistance before mentioned.

4. The combination of a motor circuit, a switch therein, a constant resistance and a resistance having a high positive temperature co-efficient connected with said circuit, a solenoid, arms carried by the core of the solenoid, a contact device adjacent to one of the arms and having connection with the coil of the solenoid, with the resistances, and with the motor circuit, a second contact device located in the motor circuit, such arms and contact devices being arranged to short circuit the aforesaid resistances upon the excitation of the solenoid, and a conductor for connecting the resistances with one of the contacts of the switch.

In testimony whereof I affix my signature in presence of two witnesses.

MARTIN KALLMANN.

Witnesses:
 WOLDEMAR HAUPT,
 HENRY HASPER.